(12) United States Patent
Lee et al.

(10) Patent No.: US 7,747,125 B1
(45) Date of Patent: Jun. 29, 2010

(54) STRUCTURED FIBER OPTIC CASSETTE WITH MULTI-FURCATED CABLE ACCESS

(75) Inventors: Wei Cheng Lee, Taipei (TW); Jui Yang Hung, Taipei County (TW); Jin Rong Liang, Millbrae, CA (US)

(73) Assignee: Alliance Fiber Optic Products, Inc.

( * ) Notice: Subject to any disclaimer, the term of this patent is extended or adjusted under 35 U.S.C. 154(b) by 0 days.

(21) Appl. No.: 12/240,257

(22) Filed: Sep. 29, 2008

Related U.S. Application Data

(60) Provisional application No. 61/001,942, filed on Nov. 7, 2007.

(51) Int. Cl.
- G02B 6/00 (2006.01)
- G02B 6/26 (2006.01)
- G02B 6/36 (2006.01)
- G02B 6/38 (2006.01)

(52) U.S. Cl. ........................ 385/135; 385/134; 385/136; 385/137; 385/138; 385/139; 385/25; 385/53; 385/59; 385/60; 385/76; 385/78; 385/80; 385/88; 385/147

(58) Field of Classification Search ............... 385/27, 385/53, 59, 60, 76–78, 80, 88, 134–139, 385/147

See application file for complete search history.

(56) References Cited

U.S. PATENT DOCUMENTS

| | | | |
|---|---|---|---|
| 4,702,551 A * | 10/1987 | Coulombe | 385/135 |
| 6,909,833 B2 * | 6/2005 | Henschel et al. | 385/135 |
| 2002/0150372 A1 * | 10/2002 | Schray | 385/135 |
| 2006/0275008 A1 * | 12/2006 | Xin | 385/135 |

* cited by examiner

*Primary Examiner*—Brian M. Healy
*Assistant Examiner*—Hung Lam
(74) *Attorney, Agent, or Firm*—Wuxi Sino IP Agency, Ltd.; Joe Zheng

(57) ABSTRACT

To minimize the space requirement inside a cassette and make cable retention force consistent and easy for fiber routing/rework, a cassette includes a cassette base molded to include a plurality of holders, a cassette cover to close the cassette base, and a plurality of blocks, respectively disposed into the holders, each of the blocks including one or more holes to accommodate one or more fiber cables. The fiber cables are fixed in the holes using a type of adhesive. In addition, bare fibers are placed inside the cassette to communicate respectively with the fiber cables.

10 Claims, 6 Drawing Sheets

STRUCTURED FIBER OPTIC CASSETTE WITH MULTI-FURCATED CABLE ACCESS

CROSS-REFERENCE TO RELATED APPLICATION

This application claims the benefits of U.S. Provisional Application No. 61/001,942, filed Nov. 7, 2007, and entitled "SINK structured fiber optic cassette with multi-furcated cable access", which is hereby incorporated by reference for all purposes.

BACKGROUND OF THE INVENTION

1. Field of the Invention

The invention is generally related to the area of optical systems and devices. In particular, the invention is related to an optic cassette with multi-furcated cable access.

2. The Background of Related Art

A typical fiber optic cassette is an integrated module that includes some optical components, such as PLC Splitter/Fused Couplers, DWDM devices and etc. Many such optical components often have bare fibers in input and output forms for ease of fiber routing inside the cassette. Depending on a specific application environment, many such cassettes also require that the fibers exiting the cassettes in furcated cable form. FIG. 1 depicts a typical fiber optic cassette 100 commonly used in the industry. The typical fiber optic cassette 100 is a typical structure of fixing furcated cables inside a cassette in such a way that the optical components inside are protected from possible external forces from the cables being pulled. The structure shown in FIG. 1 includes a base 102 supporting various components 104 and 110. The furcated cables 106 are disposed on one side of the cassette 102 and fixed onto the cassette directly using a type of epoxy 108. One of the issues with this approach is that it is hard to control how well the cables are fixed together with the cassette 100. Further, it is not easy to rework on the cables 106 if there is a need to change one of them.

Thus there is need for designs that at least overcome the above issues in addition to other benefits and advantages to be appreciated described herein.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to designs of optical devices in form of a cassette. To minimize the space requirement inside a cassette and make cable retention force consistent and easy for fiber routing/rework, a cassette includes a cassette base molded to include a plurality of holders, a cassette cover to close the cassette base, and a plurality of blocks, respectively disposed into the holders, each of the blocks including one or more holes to accommodate one or more fiber cables. The fiber cables are fixed in the holes using a type of adhesive. In addition, bare fibers are placed inside the cassette to communicate respectively with the fiber cables.

To further protect the fiber cables extending from the cassette, bendable cable boots are used to resist a pulling, pushing or bending force. The material for a cassette may be of any rigid material, such as plastic or metal (e.g., aluminum).

The present invention may be implemented as an apparatus or a part of a system. According to one embodiment, a cassette as an optical device comprises a cassette base molded to include a plurality of first and second holders; a cassette cover to close the cassette base; a plurality of first blocks, respectively disposed into the first holders, each of the first blocks including one or more holes to accommodate one or more fiber cables, wherein the fiber cables are fixed therein using a type of adhesive, a plurality of second blocks, respectively disposed into the second holders, each of the second blocks including one or more holes to accommodate one or more fiber cables, wherein the fiber cables are fixed therein using a type of adhesive, and bare fibers placed inside the cassette to couple respectively the fiber cables in the first and second blocks.

There are numerous benefits, features, and advantages in the present invention. These benefits, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2-6. However, those skilled in the art will readily appreciate that the detailed description given herein with respect to these figures is for explanatory purposes as the invention extends beyond these limited embodiments.

Figure 1:
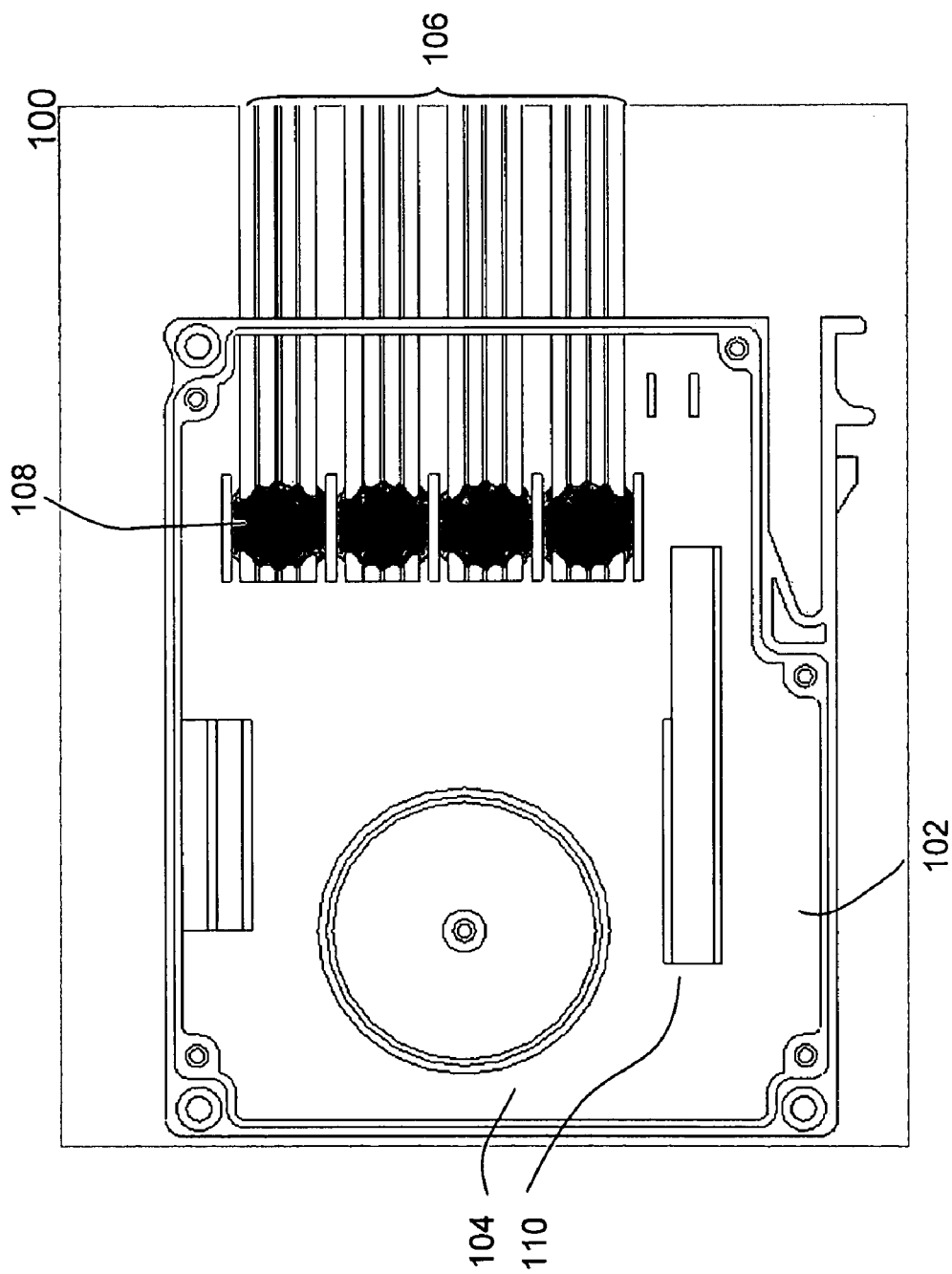
FIG. 1 depicts a typical fiber optic cassette 100 commonly used in the industry.
Figure 2:
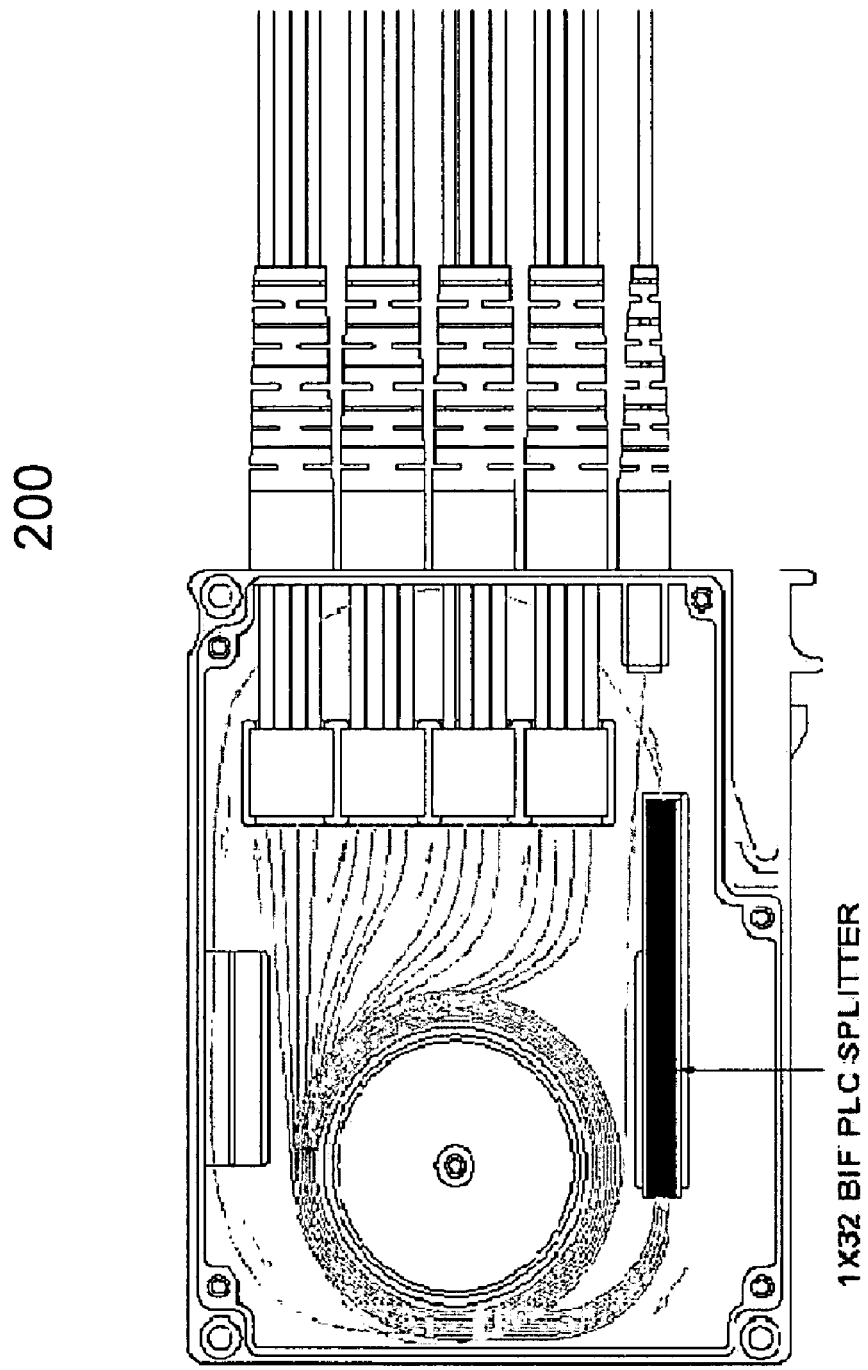
FIG. 2 shows a structure suitable for fixing furcated cables onto a cassette, according to one embodiment of the present invention.

FIG. 2 shows a structure suitable for fixing furcated cables onto a cassette 200, according to one embodiment of the present invention. This structure can minimize the space requirement inside the cassette 200 and make the cable retention force consistent and easy for fiber routing/rework. Among other benefits and advantages, the structure makes it easy to assemble various components in the cassette 200. Due to the fact that no Epoxy is applied directly to the cassette 200, it is also easier to rework on the components as well as the fibers in the cassette.

Figure 3:
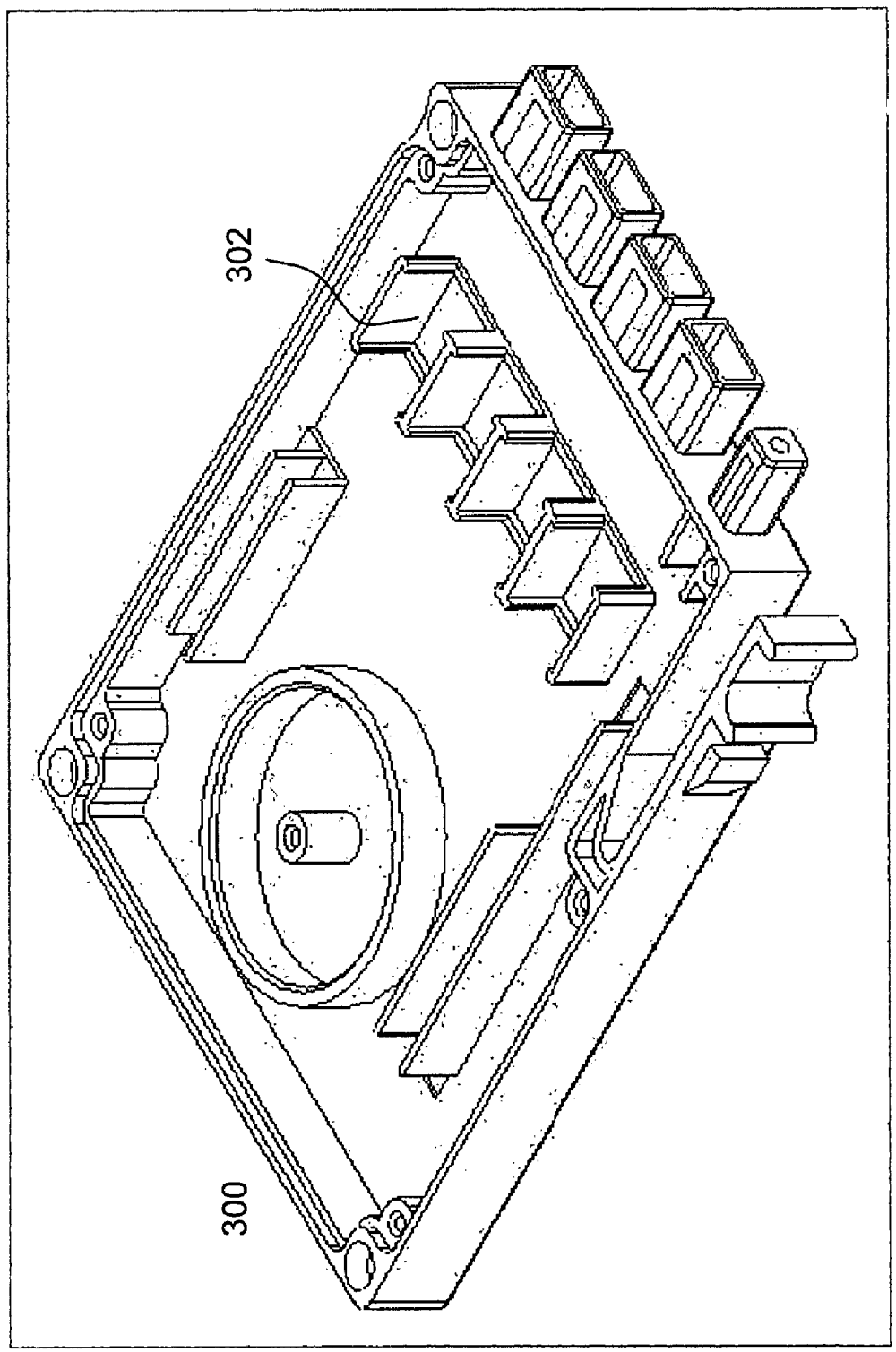
FIG. 3 shows a cassette base according to one embodiment of the present invention.
Figure 4B:
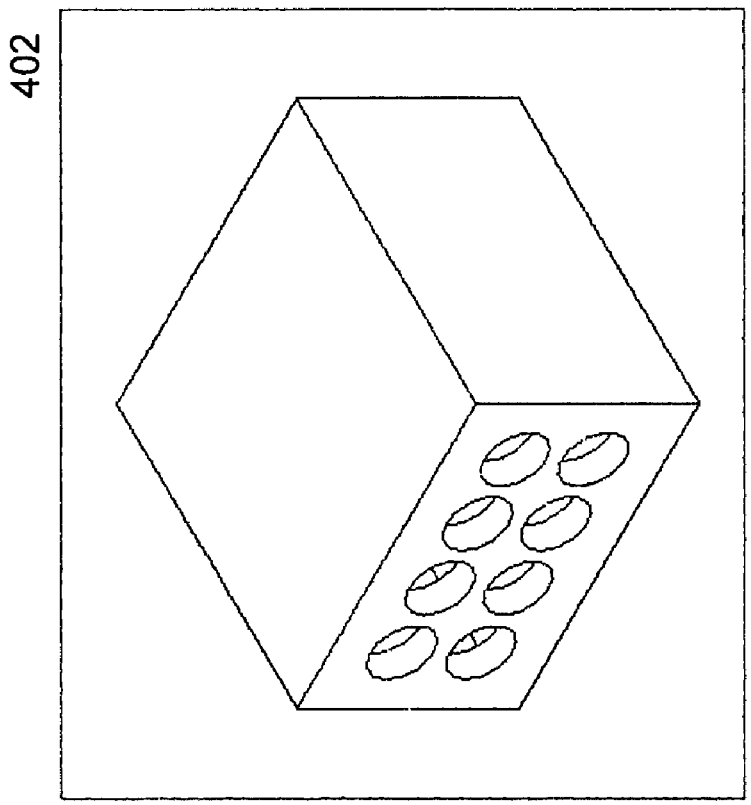
FIG. 4A and FIG. 4B show, respectively two exemplary blocks, one including a single hole and the other including a number of holes for accommodating one or more fibers therein.
Figure 4A:
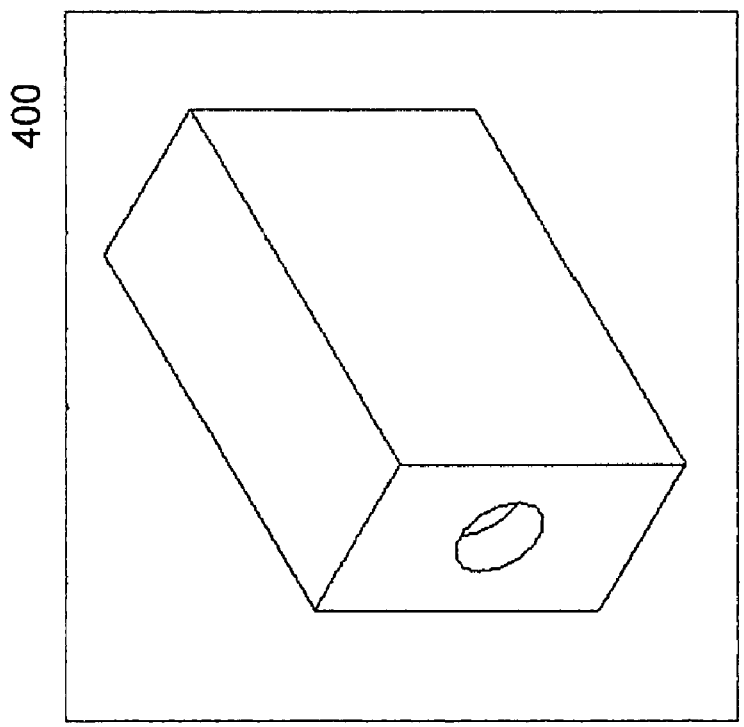

According to one embodiment, the structure includes a cassette base as shown in FIG. 3 and a (SINK) block 400 or 402 with one or more holes as shown in FIG. 4A and FIG. 4B, respectively. In an operation of assembling a cassette, the assembly process includes applying a certain amount of epoxy between furcated cables and holes of the block, and putting the block into a slot of the cassette base, as shown respectively in FIG. 5 and FIG. 6.

To facilitate the understanding of FIG. 2, a fiber optic 1×32 splitter is used as an example. A SINK structure-based cassette 200 is shown to have 32 output fiber cables grouped into 4 blocks, each having 8 cables transitioning from bare fibers on one side and furcating tube-based cables on the other. The cassette base 200 of FIG. 3 helps to further illustrate the principle of separating the cables to cassette fixation into two steps: 1) fixing 8 cables in one group into one block, thus 32 cables becoming 4 groups, and 2) disposing blocks respectively into the SINK structures 302 on the cassette base 300. With the cable boots providing bend-protection, the entire assembly can be reworked and parts in the structure can be removed out of the cassette in an easy way.

Figure 5:
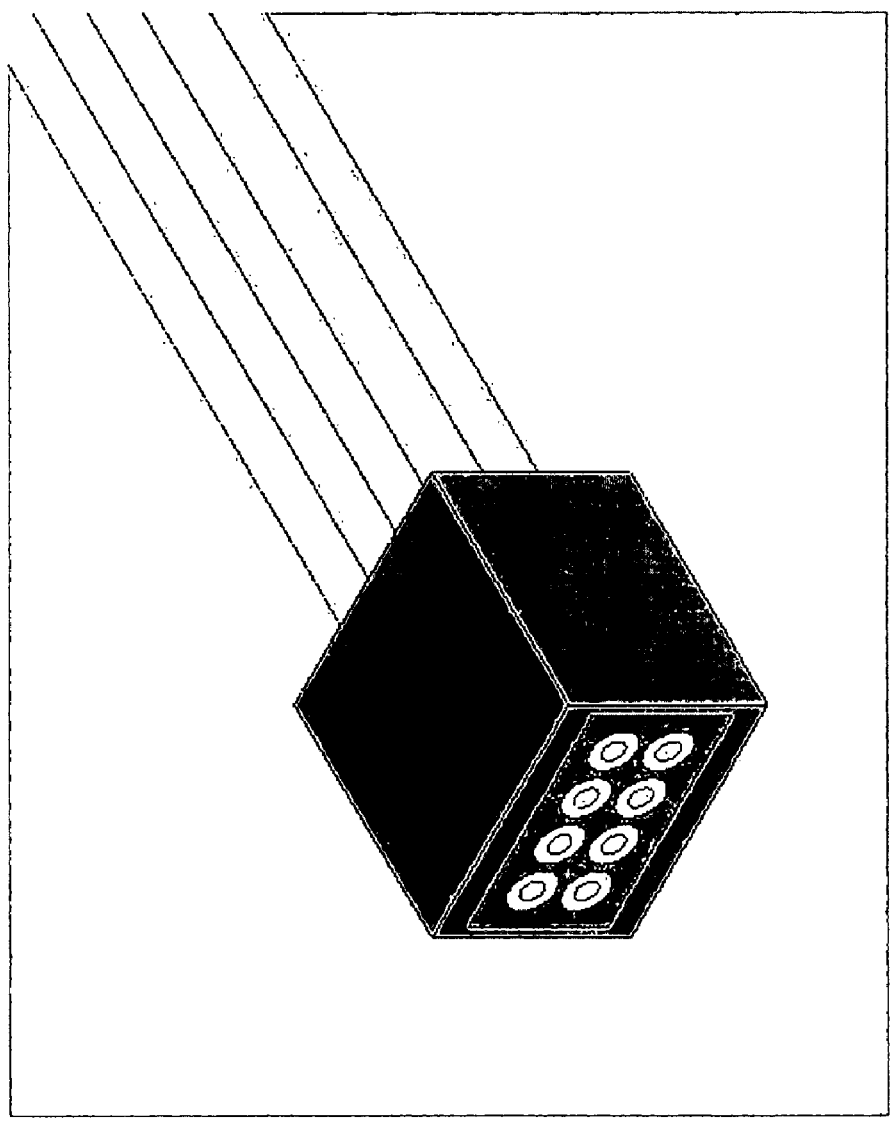
FIG. 5 illustrates a block having eight holes, each accommodating one or more fibers, such a block cab be plugged into a holder disposed in a cassette base.

FIG. 4A and FIG. 4B show respectively blocks with one or more holes to accommodate fiber cables. Using some epoxy, the cables can be readily fixed in the holes. Although FIG. 4A and FIG. 4B shows respectively a block with one and eight holes, those skilled in the art can readily appreciated that a block may include various arrangements to accommodate various fiber cables in various geometries. One of the important features, benefits and objectives in the present invention is to provide a removable block that helps fix cables in a prearranged way. Owing to using a separate process to fix cables first without touching the cassette, testing for fiber and cable pulling to ensure proper protection can be arranged before the cassette is finally integrated. In particular, FIG. 5 shows exemplary block 500 of eight holes holding 8 fiber cables through an epoxy process.

Figure 6:
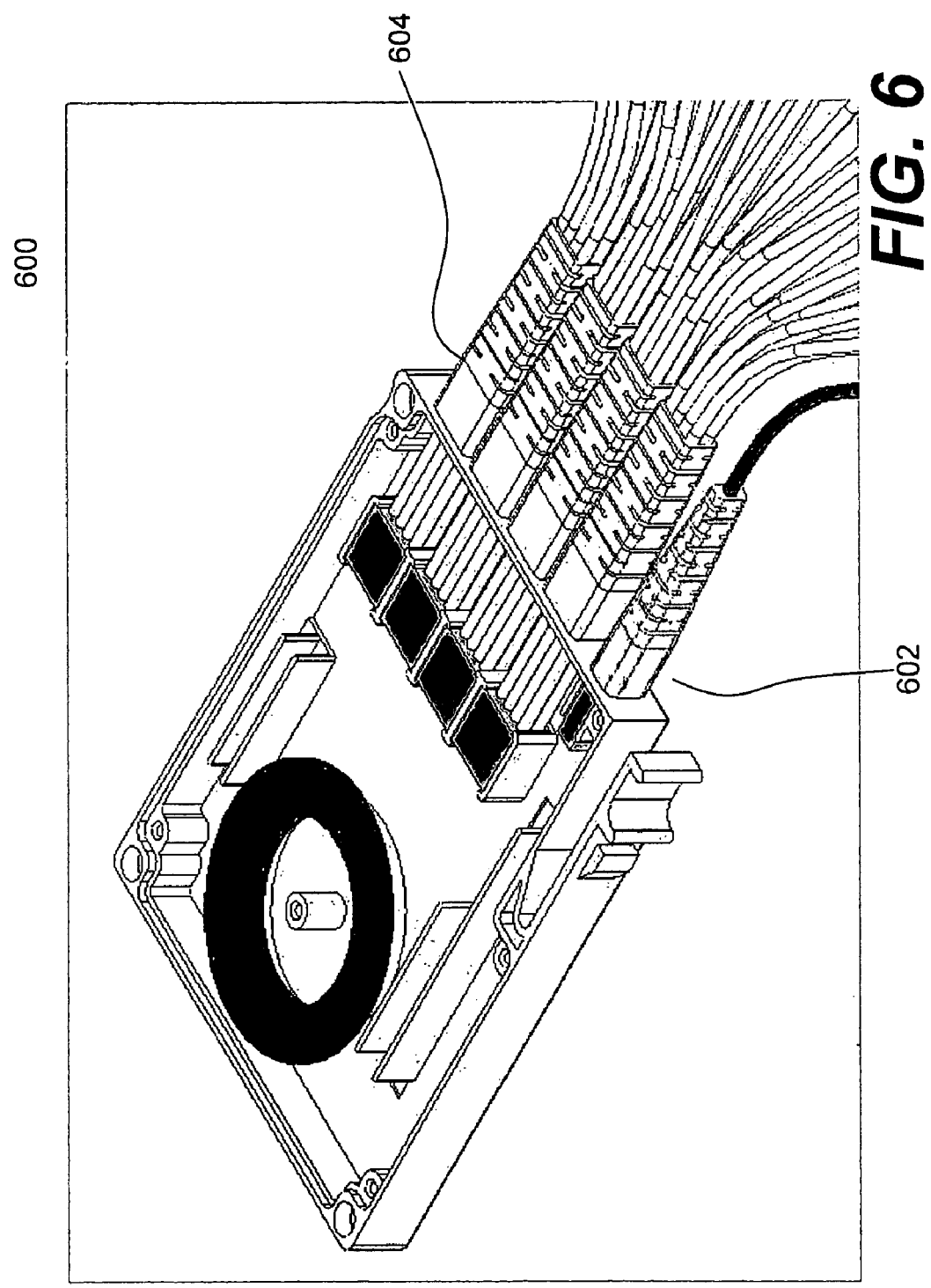
FIG. 6 shows a perspective view of a cassette base with relevant parts integrated.

Referring now to FIG. 6, a perspective view of a portion of an assembled cassette 600 that includes four blocks disposed into respective sink or block holders of the cassette base. An input cable 602 may be fixed to the cassette base in a similar way using a smaller block. FIG. 6 also shows some additional fiber bend protection boots 604 on the outside of the cassette that in an actual application will provide additional fiber retention and protection against possible pulling. The bare fiber portion inside the cassette 600 is not shown but nevertheless shown in FIG. 2.

In one embodiment as shown in FIG. 2, the bare fibers are provided within the cassette to communicate with the fibers (e.g., to guide light beams from the fibers to another port). To facilitate the bending of the bare fibers within the cassette, a wheel or round structure 104 is provided to turn the bare fibers around.

Depending on implantation and the use of the cassette, the material to make the cassette case or a cover may be of any solid material, for example, solid plastic or metal.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, a single port 602 is shown in FIG. 6, there may be multiple ports, each of the ports is structured similar to those ports 604. Accordingly, the scope of the present invention is defined by the appended claims rather than the foregoing description of embodiments.

What we claim:

1. A cassette comprising:
   a cassette base molded to include a plurality of holders;
   a cassette cover;
   a plurality of blocks, respectively disposed into the holders, each of the blocks including one or more holes to hold one ends of one or more fiber cables by a type of adhesive, wherein the other ends of the fiber cables are extended respectively to an array of sockets mounted on one or more sides of the cassette to receive optical plugs, and
   bare fibers placed inside the cassette to communicate respectively with the one ends of the fiber cables.

2. The cassette as recited in claim 1, further including an additional holder to hold a single block to accommodate one or more fibers to as an input while the fiber cables being fixed in the blocks are outputs of the cassette.

3. The cassette as recited in claim 2, wherein the optical plugs are protected by a set of bendable boots.

4. The cassette as recited in claim 1, further including an additional holder to hold a single block to accommodate one or more fibers to as an output while the fiber cables being fixed in the blocks are inputs of the cassette.

5. The cassette as recited in claim 1, wherein the sockets are interfaces of the cassette to facilitate optical communications between outside optical cables and the fiber cables within the cassette.

6. The cassette as recited in claim 1, further including a wheel to allow the bare fibers to turn around to a single port of the cassette.

7. The cassette as recited in claim 6, wherein the single port includes a collimator that is also disposed onto the cassette base.

8. The cassette as recited in claim 7, wherein the single port is formed by an additional block holding a block accommodating one or more fibers as an input or output of the cassette.

9. A cassette comprising:
   a cassette base molded to include a plurality of first and second holders and an array of sockets;
   a cassette cover to enclose the cassette base;
   a plurality of first blocks, respectively disposed into the first holders, each of the first blocks including one or more holes to hold one ends of a first group of fiber cables inserted therein and by a type of adhesive;

a plurality of second blocks, respectively disposed into the second holders, each of the second blocks including one or more holes to hold one ends of a second group of fiber cables inserted therein and by a type of adhesive, wherein the other ends of the fiber cables in the first and second groups are extended respectively to the array of sockets mounted to receive corresponding optical plugs, and bare fibers placed inside the cassette to couple respectively with the one ends of the fiber cables in the first and second blocks.

10. The cassette as recited in claim 9, further including a round structure to allow the bare fibers to turn around within the cassette.

* * * * *